L. C. VAN RIPER.
STARTING DEVICE FOR EXPLOSIVE ENGINES.
APPLICATION FILED FEB. 20, 1911.
1,046,407.
Patented Dec. 3, 1912.
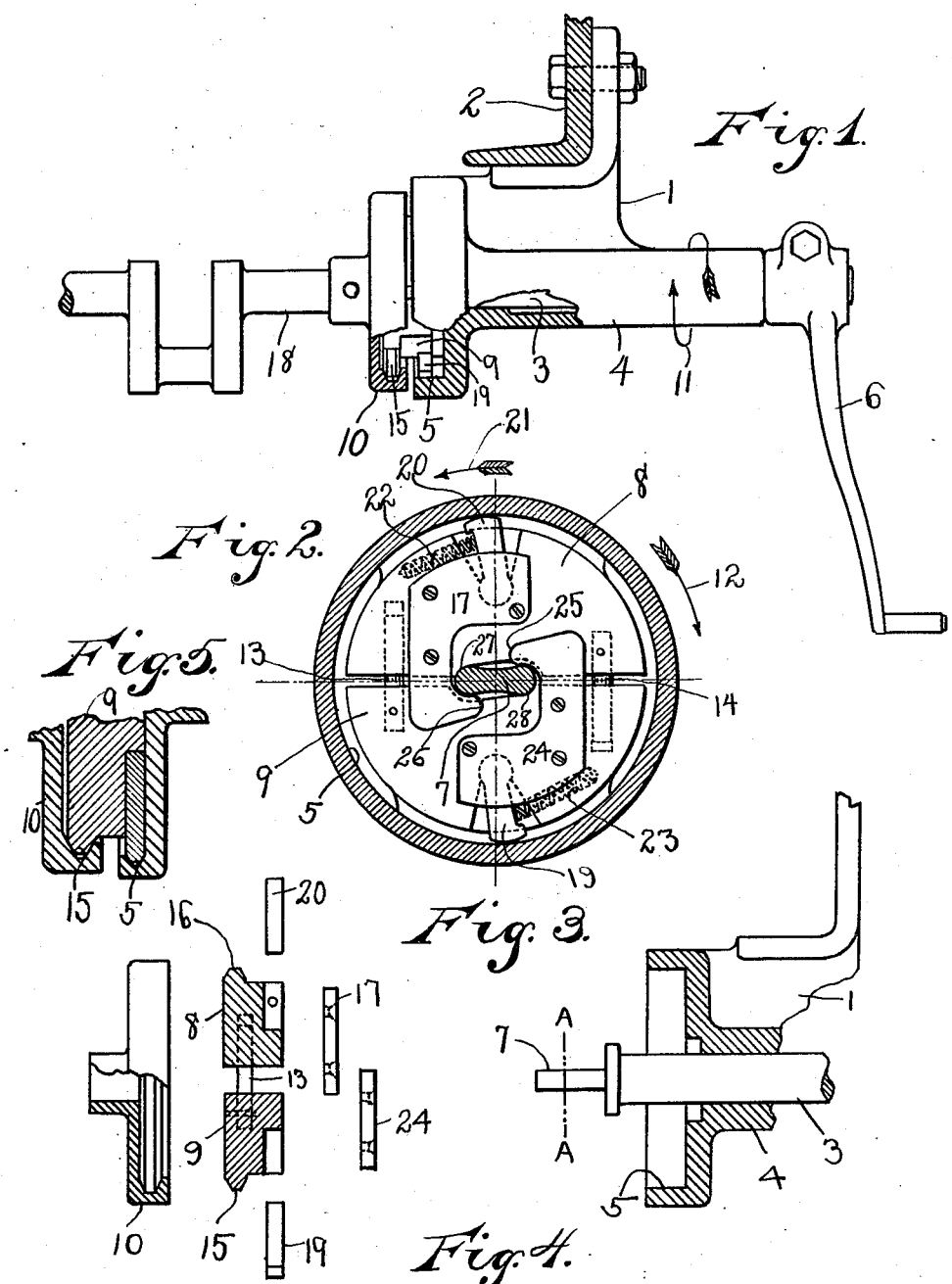
WITNESSES:
INVENTOR
ATTORNEY

UNITED STATES PATENT OFFICE.

LEWIS C. VAN RIPER, OF NEW YORK, N. Y.

STARTING DEVICE FOR EXPLOSIVE-ENGINES.

1,046,407.  Specification of Letters Patent.  Patented Dec. 3, 1912.

Application filed February 20, 1911. Serial No. 609,760.

*To all whom it may concern:*

Be it known that I, LEWIS C. VAN RIPER, of the borough of Manhattan, city, county, and State of New York, have invented certain new and useful Improvements in Starting Devices for Explosive-Engines, of which the following is a specification.

The purpose of this invention is to provide a starting device for explosive engines which will release the crank handle, or other means used in operating the device, from the engine shaft upon forward or backward rotation of said engine shaft by its engine and avoid any danger to the person or mechanism when a back fire occurs, and is an improvement upon several pending applications filed by me in the United States Patent Office as follows: Sept. 12, 1910, Serial No. 581,600; October 6th, 1910; Serial No. 585,577; Jan. 25th, 1911, Serial No. 604,565, and two pending applications in which I am a joint applicant, filed Nov. 30, 1910, Serial No. 594,834 and Dec. 14th, 1910, Serial No. 697,335, but of which I am the entire owner by assignments duly recorded in the United States Patent Office.

The present invention is an improvement over the former ones, by reason of using friction dogs in place of rollers to release the clutch on backfire of the engine. It has been found that the rollers will sometimes slip when subjected to severe strains but that the particular style of friction dogs shown herewith will not, and therefore are more reliable and the construction of the device is simplified.

Reference is to be had to the accompanying drawings forming a part of this specification.

Like numerals of reference wherever they occur, denoting like parts throughout this specification and drawings, wherein:

Figure 1 is a side view partly in section of my device as attached to an automobile frame, Fig. 2 is an end view of the clutch mechanism, Fig. 3 shows the principal parts in detail, Fig. 4 is a section on line A—A of Fig. 3. Fig. 5 is a sectional view with a variation in the friction dogs and the non-rotatable friction surface.

This device consists of a supporting member 1 fastened to the front cross member 2 of an automobile frame, or it may be fastened direct to the engine or other suitable place, the bearing 4 which forms a part of the supporting member 1 carries the crank handle shaft 3, at one end of which is fastened the crank handle 6 while the other end is formed into a flattened portion 7 as shown in Figs. 3 and 4.

When the crank handle shaft 3 is rotated in the direction of arrows 11 and 12 the flattened portion 7 of shaft 3 bears against the clutch members 8 and 9 at 27 and 28 respectively, thus forcing the said clutch members 8 and 9 apart and causing the wedge shaped friction shoes 15 and 16 to frictionally grip the friction disk 10 which may be a part of or connected to the engine shaft 18. The clutch members 8 and 9 are guided in each other by the plungers 13 and 14. This said frictional gripping takes place only upon the continued forward rotation of the crank handle shaft 3 until the friction dogs 19 and 20 are forced backward in the direction of arrow 21 against their respective springs 23 and 22 due to their friction against the non-rotatable friction surface 5 which forms a part of the supporting member 1.

When the engine back fires a backward impulse is imparted to the engine shaft 18 which rotates the friction disk 10 backward, while the clutch members 8 and 9 are prevented from rotating backward along with the friction disk 10 by means of the friction dogs 19 and 20 wedging themselves against the non-rotatable friction surface 5 thereby reducing the friction between the friction shoes 15 and 16 and the friction disk 10 thus permitting the friction disk 10 to rotate backward without the starting device following, as the said reduced friction allows the friction disk 10 to slip on the friction shoes 15 and 16.

When the engine starts forward under its own power the increased speed of the engine shaft over the speed of the starting device will automatically release the starting device from the engine shaft, but more positive means may be used by adapting the disengaging plates 17 and 24, plate 17 being fastened to clutch member 8 and plate 24 to clutch member 9. The hook ends 25 and 26 of the plates 24 and 17 respectively reaching around the crank handle shaft 7 as shown in Fig. 2.

The friction dogs 19 and 20 may be made wedge shaped with the non-rotatable friction surface having a wedge shaped groove to match as shown in section in Fig. 5. This construction makes the frictional grip of the friction dogs on the non-rotatable friction surface more positive.

What I claim, is:

1. In a starting device for explosive engines, the combination of a friction surface upon or connected to an engine shaft, a friction clutch member rotatable both forward and backward, means for rotating said clutch member, means for engaging said clutch member with said friction surface upon forward rotation of said rotating means, means for disengaging said clutch member from said friction surface upon backward rotation of said engine shaft by its engine, said disengaging means comprising the following instrumentalities, a non-rotatable friction surface, friction dogs, and springs.

2. In a starting device for explosive engines, the combination of a friction surface upon or connected to an engine shaft, a friction clutch member rotatable both forward and backward, means for rotating said clutch member, means for engaging said clutch member with said friction surface upon forward rotation of said rotating means and means for disengaging said clutch member from said friction surface upon backward rotation of said engine shaft by its engine, said disengaging means comprising the following instrumentalities, a grooved non-rotatable friction surface, friction dogs with shoes shaped to fit said grooved surface, and springs.

3. In a starting device adapted to be used in connection with explosive engines, the combination of an annular grooved friction surface upon or connected to an engine shaft, an expanding friction clutch having wedge shaped friction shoes to engage the said grooved friction surface, means for frictionally connecting said friction clutch to said engine shaft through said friction surface to move connectedly in a forward direction, and means for reducing the friction in said frictional connection upon backward rotation of said engine shaft by its engine, said friction reducing means comprising a grooved non-rotatable friction surface, friction dogs having wedge shaped shoes and springs.

4. In a starting device adapted to be used in connection with explosive engines, the combination of an annular grooved friction surface upon or connected to an engine shaft, an expanding friction clutch having wedge shaped friction shoes to engage the said grooved friction surface, means for frictionally connecting said friction clutch to said engine shaft through said friction surface to move connectedly in a forward direction, friction dogs having wedge shaped shoes, a grooved non-rotatable friction surface and means for keeping the said friction dogs always in frictional engagement with groove in said non-rotatable friction surface upon forward rotation.

5. In a starting device for explosive engines, the combination of a crank handle, rotatable both forward and backward, means for frictionally connecting said crank handle to an engine shaft upon forward rotation of said crank handle and means for disconnecting said crank handle from said engine shaft upon backward rotation of said engine shaft by its engine, said disconnecting means comprising friction dogs having wedge shaped shoes, a grooved non-rotatable friction surface and means for keeping said friction dogs in engagement with said non-rotatable friction surface upon forward rotation of said crank handle.

6. In a starting device for explosive engines, the combination of rotating means, rotatable both forward and backward, means for frictionally connecting said rotating means to an engine shaft upon forward rotation of said rotating means and means for disconnecting said rotating means from said engine shaft upon backward rotation of said engine shaft by its engine, said disconnecting means comprising friction dogs, a non-rotatable friction surface and means for keeping said friction dogs in engagement with said non-rotatable friction surface upon forward rotation.

7. In a starting device for explosive engines, the combination of rotating means, rotatable both forward and backward, means for frictionally connecting said rotating means to an engine shaft upon forward rotation of said rotating means and means for disconnecting said rotating means from said engine shaft upon backward rotation of said engine shaft by its engine, said disconnecting means comprising friction dogs having wedge shaped shoes, a grooved non-rotatable friction surface and means for keeping said friction dogs in engagement with said non-rotatable friction surface upon forward rotation of said rotating means.

8. In a starting device for explosive engines, the combination of rotating means, rotatable both forward and backward, means for frictionally connecting said rotating means to an engine shaft upon forward rotation of said rotating means and means for disconnecting said rotating means from said engine shaft upon backward rotation of said engine shaft by its engine, said disconnecting means comprising friction dogs, a non-rotatable friction surface, means for keeping said friction dogs in engagement with said non-rotatable friction surface upon forward rotation of said rotating means.

9. In a starting device adapted to be used in connection with explosive engines, the combination of a friction member upon or connected to an engine shaft, said friction member having a wedge shaped engaging surface, rotatable clutch members having friction shoes with wedge shaped engaging surfaces, means for rotating said clutch members, means for frictionally connecting said clutch members, to said friction member upon forward rotation of said rotating means and means for disconnecting said frictional connection upon backward rotation of said engine shaft by its engine, said disconnecting means comprising the following instrumentalities, friction dogs having wedge shaped friction shoes, a non-rotatable friction surface having a wedge shaped shoe engaging surface and springs.

LEWIS C. VAN RIPER.

Witnesses:
HARRY JACOBSON,
ABRAHAM NOVICK.

Copies of this patent may be obtained for five cents each, by addressing the "Commissioner of Patents, Washington, D. C."